United States Patent [19]

Nelle

[11] Patent Number: 4,519,709
[45] Date of Patent: May 28, 1985

[54] PHOTOELECTRIC INCREMENTAL LENGTH OR ANGLE MEASURING DEVICE

[75] Inventor: Gunther Nelle, Bergen, Fed. Rep. of Germany

[73] Assignee: Dr. Johannes Heidenhain GmbH, Traunreut, Fed. Rep. of Germany

[21] Appl. No.: 443,063

[22] Filed: Nov. 19, 1982

[30] Foreign Application Priority Data

Dec. 10, 1981 [DE] Fed. Rep. of Germany ....... 3148910

[51] Int. Cl.³ .................. G01B 11/00; G01B 11/02
[52] U.S. Cl. .................................... 356/373; 356/375; 356/383; 250/237 G; 33/125 A; 33/125 C
[58] Field of Search ............. 356/374, 395, 373; 33/125 A, 125 C; 250/237 G

[56] References Cited

U.S. PATENT DOCUMENTS

| | | | |
|---|---|---|---|
| 3,166,624 | 1/1965 | Vargady | 356/374 |
| 3,812,352 | 5/1974 | MacGovern | |
| 4,297,033 | 10/1981 | Nelle | 356/374 |

FOREIGN PATENT DOCUMENTS 2510273 5/1980 Fed. Rep. of Germany.
1063060 3/1967 United Kingdom.

Primary Examiner—R. A. Rosenberger
Assistant Examiner—Michael F. Vollero
Attorney, Agent, or Firm—Willian, Brinks, Olds, Hofer, Gilson & Lione Ltd.

[57] ABSTRACT

A photoelectric incremental length or angle measuring device capable of alternate embodiments using transillumination or reflected-light arrangements and having a scanning grid slidable with respect to a spaced measuring scale grid. The ratio of the widths of the photopermeable to the photoimpermeable lines of the scanning grid of such a device is changed from the conventional ratio of 1:1 to a higher ratio which is greater than 2:1, preferably 3:1, while the ratio for these areas of the measurement division grid remains at 1:1. This change of the scanning grid ratio acts to increase the range of acceptable scanning distances.

13 Claims, 7 Drawing Figures

PHOTOELECTRIC INCREMENTAL LENGTH OR ANGLE MEASURING DEVICE

BACKGROUND OF THE INVENTION

This invention relates to improved incremental path measuring devices which measure length or angle.

A variety of path measuring devices for determining the relative position of two objects have been described in both direct-light and transillumination embodiments in many publications. It is known that in measuring devices employing incremental measuring arrangements, the optimal separation between the scanning grid of the scanning unit and the measurement grid of the measuring scale of the measuring device depends directly on the chosen grid constant of the measurement grid or division. This optimal scanning separation is subject to very close tolerances. This is because the magnitude of the scanning signal generated by photosensitive components of the scanning unit depends directly on the intensity of the light modulation arising from relative movement between the scanning and measurement grids, and the light modulation is strongly influenced by the scanning separation.

It is known that the intensity of the modulated scanning signal is greatest when the scanning separation has the value of zero, and the scanning grid and the measurement grid of the measurement apparatus lie in a single plane; only then is there an exact coincidence of the respective lines and gaps of the two grids. As the scanning separation increases, the intensity of the modulated scanning signals decreases.

A direct sliding contact of the scanning plate (which defines the scanning grid) upon the measurement scale (which defines the measurement grid) is impractical because of the high potential for damage to these components. The interposition of optical elements for the imaging of one grid on the other is undesirable, at least in the case of small and medium grid constants, because the cost of the device would be increased substantially.

In practice, therefore, a certain optimal scanning separation is generally chosen for the selected grid constant and very close tolerances are employed for this scanning separation. For well-known reasons, light intensity at the photosensitive elements of the scanning unit increases when the scanning separation decreases and, conversely, decreases when the scanning separation is increased. This holds as long as the scanning separation remains close to the value zero.

Such an increase or decrease of light intensity caused by distance variations is acceptable, however, only in a certain narrow range, in view of the necessary signal amplification. This is because amplifiers of the type widely used for this special application function reliably only if the input signals to these amplifiers do not drop below a certain minimum value and do not exceed a certain maximum value. In the event an input signal were to deviate from the admissible drive range of the amplifier, distortions of the output signal of the amplifier would occur. For example, with excessively low signals, the susceptibility to problems related to internal noise rises.

Various measures have been proposed to alter the aforementioned relations of scanning distance and light flux or intensity in a modulated scanning system in order to improve photoelectric measuring devices.

U.S. Pat. No. 3,812,352, for example, suggests that the scanning separation be selected according to the formula $Z_1 = nS_1S_2/\lambda$, in which $Z_1$ is the scanning separation or distance, $S_1$ is the grid constant of the first grid, $S_2$ is the grid constant of the second grid, $\lambda$ is the light wavelength, and n is a positive whole number. If n is chosen to have a value of 1 in this formula, then for the grid constants given in the above-identified patent the relations shown there in FIGS. 5 and 6 between light intensity and scanning distance are achieved. With grids of differing grid constants, however, this approach is applicable only for the specific conditions presented therein, i.e., only for measuring arrangements which operate in the direct-light mode and which employ fine grid constants (e.g., 25 microns).

Another approach to the selection of favorable conditions for scanning tolerances is suggested in German Pat. No. 25 10 273. The vignetting proposed there of the photosensitive components leads to the desired result, but only in the case of grid constants that are greater than 100 microns, and in measuring systems which, as indicated therein, operate in the direct-light mode.

These teachings, however, are practically inapplicable in measuring devices that are intended for medium grid constants between 25 and 100 microns and which operate either as direct-light or as transilluminating measuring devices.

SUMMARY OF THE INVENTION

The present invention is directed to an improved measuring device either of the direct-light or of the transillumination type with a medium grid constant, in which a considerable amount of variation in the scanning distance between the measurement grid and scanning grid is acceptable, despite the simple construction of the measuring device.

According to this invention, the ratio of the photoimpermeable line width to the photopermeable line width of the scanning grid of the invention is changed from the conventional ratio of 1:1 to a higher ratio which is substantially greater than 1:2.

A particular advantage of the invention is that it provides a greater range of acceptable scanning distances. In particular, when a medium scanning distance of $a = (0.05 - 0.1)g^2/\lambda$ is used, a pronounced maximum of the intensity of the modulated scanning signal occurs at a non-zero scanning separation, such that the intensity of the modulated scanning signal decreases for scanning distances which are either greater or less than the scanning distance which produces the maximum modulated scanning signal. This is in direct contrast to the known prior art devices in which the maximum value of the intensity of the scanning signals occurs at a zero scanning distance and becomes steadily smaller as the scanning distance increases.

The invention itself, together with further objects and attendant advantages, will best be understood by reference to the following detailed description taken in connection with the accompanying figures.

BRIEF DESCRIPTION OF THE DRAWINGS

FIG. 5b is a sectional view taken along line 5b—5b of FIG. 5a.

FIG. 5c is a sectional view taken along line 5c—5c of FIG. 5a.

DETAILED DESCRIPTION OF THE PREFERRED EMBODIMENTS

Figure 1:
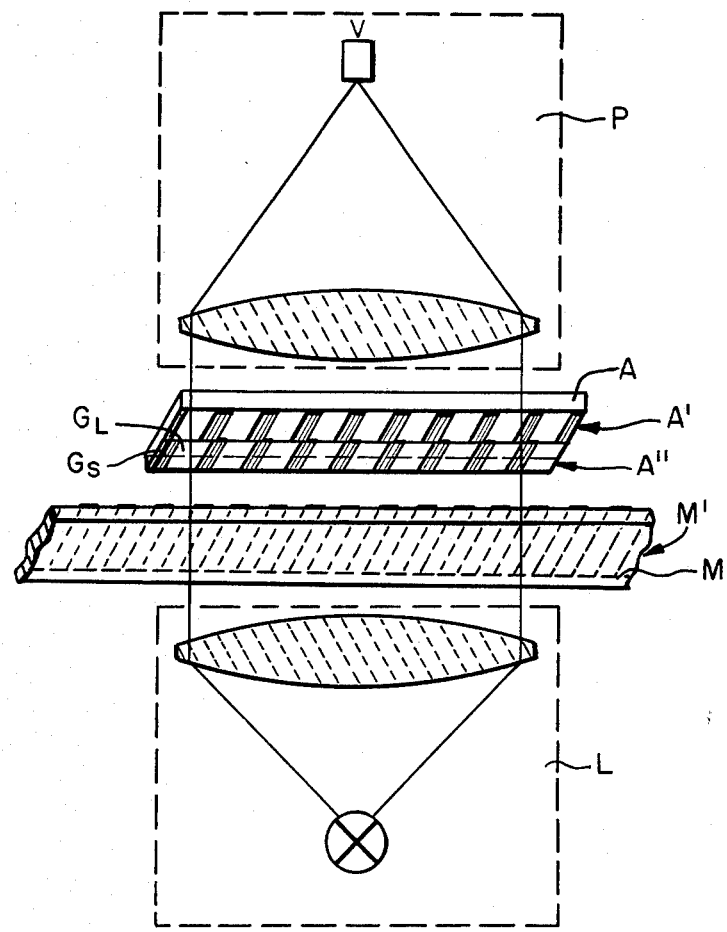
FIG. 1 is a schematic diagram of a first preferred embodiment of the invention, utilizing a transillumination arrangement.

Turning now to the drawings, FIG. 1 is a schematic representation of an incremental path measuring device which operates according to the transillumination principle. This device includes an illumination means L, a measuring scale M which defines a measurement division grid M', a scanning plate A which defines two scanning grids A' and A", and a photosensitive means P. Relative movement between the measuring scale M and the scanning plate A modulates the light which passes through the grids M', A' and A" in a known manner. This light modulation causes a triangular wave signal to be generated at the output of photoelectric detector elements included in the photosensitive means P when the measurement grid M' and the scanning grids A',A" are characterized by the same grid constant g and the same line-to-gap relation (ratio). In practice, an approximately sinusoidal signal output is sought which, in general, is obtained in the case of scanning distances greater than zero.

Through the phase displacement of the scanning grids A' and A", there can be determined the direction of relative movement between the scale M and the scanning plate A. In such arrangements the grid lying closer to the illumination means L is ordinarily designated the entry grid and the grid lying closer to the photosensitive means P is designated the exit (or output) grid.

In FIG. 1, both the measurement grid M' and the scanning grids A',A" are made up of alternating photopermeable lines and photoimpermeable lines (light fields and dark fields). All three grids M',A',A" have the same grid constant g and the measurement grid M' utilizes light fields and dark fields of equal widths in the measuring direction. In contrast the scanning grids A',A" utilize light fields which are about twice as wide as the dark fields in the measuring direction as described below.

Figure 2:
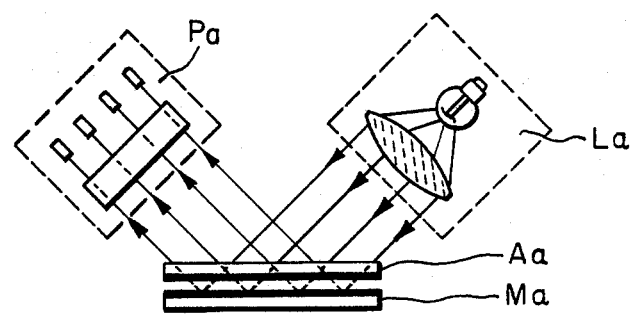
FIG. 2 is a schematic diagram of a second preferred embodiment similar to that shown in FIG. 1, but utilizing a direct-light illumination arrangement.

FIG. 2 analogously represents a path-measuring device which operates in the direct-light mode. This device includes illumination means $L_a$ which directs light along an illumination beam path through a scanning plate $A_a$ onto a measuring scale $M_a$. This scale $M_a$ defines a reflection grid, and light is reflected by reflective portions of the grid at a corresponding angle through the gaps in the grid of the scanning plate $A_a$ and impinges on photoelectric elements $P_a$ which generate a scanning signal corresponding to the modulated light flux. The grid of scanning plate $A_a$ is made up of alternating light fields and dark fields, and the width of the light fields is greater than that of the dark fields by a ratio greater than 2:1, as described below. It should be apparent that such a large ratio of light field to dark field width causes more light to be reflected back to the photoelectric elements $P_a$, thereby permitting greater tolerances in the adjustment of the scanning distance or separation between the scale $M_a$ and the scanning plate $A_a$. By accurately adjusting the scanning separation, the amplitude of the scanning signals generated by the elements $P_a$ can be increased at certain scanning separations.

Figure 3:
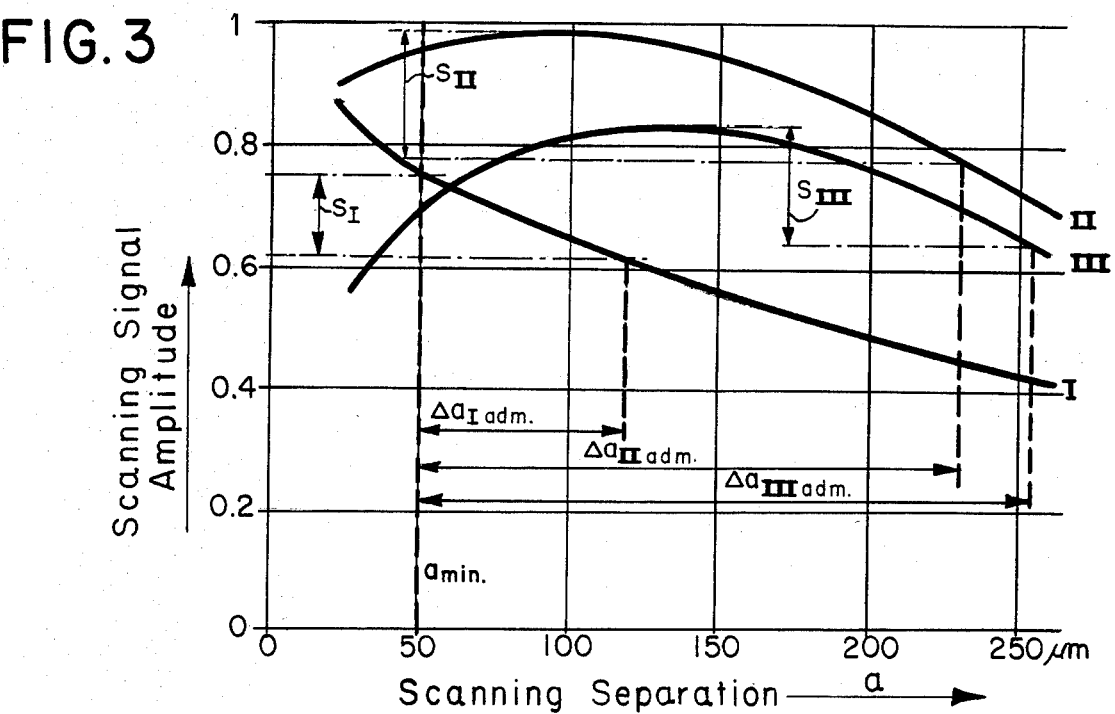
FIG. 3 is a graph illustrating the dependence of the light flux on the scanning distance for different grid-ratio values.

FIG. 3 shows a comparison of the variation of the signal amplitude at the output of the photoelectric elements $P,P_a$ as a function of the scanning separation a. Curve I corresponds to the conventional figuration of the scanning grid with a light field width to dark field width ratio of 1:1, and the curves II and III correspond to two different figurations of the scanning grids in accordance with the present invention. From Curve I, it is evident that the scanning signal generated by the elements $P,P_a$ is at its maximum at minimum scanning separations, and that this signal decreases progressively as the scanning separation increases. For a given maximum range S of acceptable scanning signal amplitudes (maximum change of 20%), the scanning separation a can be increased only to a certain extent until the signal generated by the photoelectric elements falls below the lower acceptable limit. A reduction of the separation outside this range would result in an increase of the scanning signal, which would lead to distortion of the scanning signal as mentioned above in consequence of overloaded amplifiers.

In the curves represented in FIG. 3, it is taken as a starting assumption that the minimum acceptable scanning separation a is 50 microns. In many applications, a further decrease is not practical because of the increasing danger of damage to the components by dust particles. The value of 50 microns, therefore, is the lower limit $a_{min}$ for the scanning separation. The acceptable range for the scanning separation a is determined now from the respective curve I, II or III and is equal to the range of separation a which provides no more than a 20% deviation in the scanning signal amplitude.

It can be seen from FIG. 3 that the curves II and III, which are characteristic of devices built in accordance with two forms of this invention, permit a substantially higher scanning separation tolerance $\Delta a_{adm}$ than is otherwise possible in photoelectric measuring devices of this category.

Curve II corresponds to grids A', A" of the scanning plate A in which the ratio of photoimpermeable line width $G_S$ (dark-field width) to grid constant g is 1:4, i.e., the ratio of photoimpermeable line width $G_S$ to photopermeable line width $G_L$ (light-field width) is 1:3. The ratio of dark-field width to light-field width in the measurement grid M', however, is maintained at 1:1.

Figure 5A:
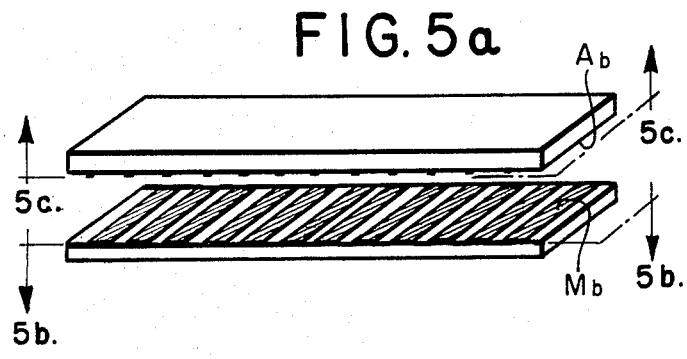
FIG. 5a is a fragmentary view of a portion of a measuring scale and scanning plate built in accordance with this invention.
Figure 5B:
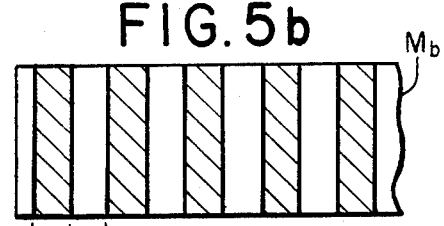
Figure 5C:
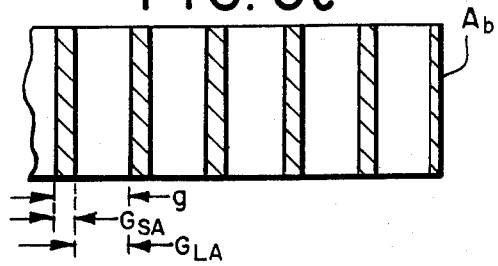

FIGS. 5a, 5b and 5c define the grid constant g, the dark field width $G_{SM}$ and the light field width $G_{LM}$ for a measurement grid M" as well as the grid constant g, the dark field width $G_{SA}$ and the light field width $G_{LA}$ for a scanning grid A".

Curve III corresponds to scanning grids A' and A" having a dark-field/light-field width ratio of 1:7 and a measurement grid M' having a dark-field/light-field width ratio of 1:1.

It is also apparent from FIG. 3 that an increase of the light-field/dark-field width ratio increases the acceptable scanning distance tolerance $\Delta a_{adm}$; however, extremely high width ratios have an adverse effect on the absolute signal amplitude of the scanning signal.

It is apparent that the foregoing description of the invention will enable one skilled in the art to adapt the teaching given to the requirements of specific applications.

Figure 4:
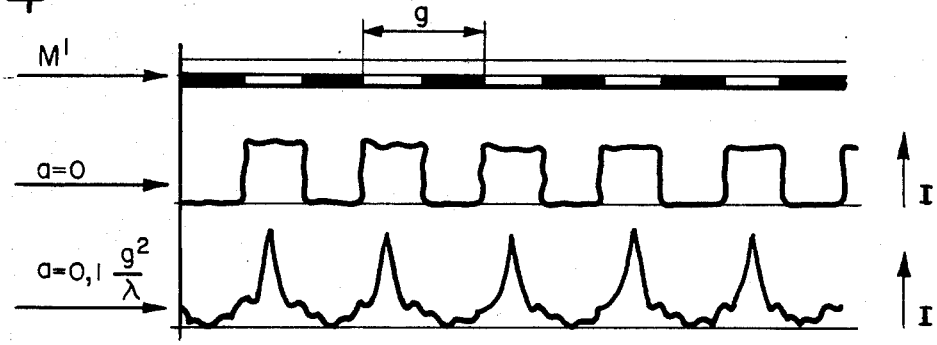
FIG. 4 presents typical wave diagrams of the modulated light intensity behind a grid for two different scanning distances.

FIG. 4 shows the light intensities I behind a measurement grid M', in the first case with a scanning separation of $a=0$, and in the second case with a separation of $a=0.1\ g^2/\lambda$. Directly in the grid plane, the light intensity is in rectangular form which corresponds to the grid shape, while at a distance of, say, $0.1\ g^2/\lambda$, narrow intensity peaks arise. If the grid M' is scanned at this distance $0.1\ g^2/\lambda$ by a second grid having an equal grid constant but photoimpermeable lines which are only as wide as the intensity peaks are broad, then relative movement between these two grids modulates transmitted or reflected light with a modulation amplitude which is at a maximum at this distance and diminishes both on reduction and also on increase of the scanning separation. For a given range of acceptable scanning signal amplitudes, there can thus be permitted a greater distance change between the scanning grid and the measurement grid than in the usual scanning plates where the maximum of the modulation amplitude is attained at a zero scanning separation between the scanning grid and the scale grid.

In simple direct-light systems such as FIG. 2 in which the illumination means $L_a$ and the photosensitive means $P_a$ are positioned on the same side of the scale $M_a$, there is an added advantage. Because of the narrow dark field line width in the scanning grids on the scanning plate $A_a$, the gaps on the scanning grid are correspondingly larger and they act to let more light pass on to the measurement grid. The amplitude of the evaluated signal is thereby increased.

Other embodiments of the invention will be apparent to those skilled in the art from a consideration of this specification or practice of the invention disclosed herein. It is intended that the specification and the examples disclosed above be considered as exemplary only, and that it be understood that it is the following claims, including all equivalents, which define the scope of this invention.

I claim:

1. In a photoelectric, incremental path measuring device of the type comprising illuminating means for generating collimated illuminating light of wavelength $\lambda$; a measuring scale which defines a measurement grid having a predetermined grid constant g; a scanning plate which defines at least one scanning grid having the same grid constant as the measurement grid; said measurement grid being separated from the at least one scanning grid by a distance $a=kg^2/\lambda$, the improvement comprising:

k is a number in the range between about 0.0 and about 0.3;

one of the measurement and scanning grids comprises alternating light grid lines and dark grid lines of selected widths in which the ratio between the light grid line width and the dark grid line width is greater than 2:1; and said measurement grid oriented parallel to said scanning grid.

2. The invention of claim 1 wherein the ratio between the light grid lines and dark grid line width is about 3:1.

3. The invention of claim 1 wherein the measuring device operates in the transillumination mode; wherein the one of the measurement and scanning grids acts as an exit grid to modulate light which has previously interreacted with the other of the measurement and scanning grids; wherein the ratio between the light grid line width and the dark grid line width of the one of the measurement and scanning grids is about 3:1; and wherein the other of the measurement and scanning grids is positioned adjacent the illuminating means and comprises alternating light grid lines and dark grid lines of selected widths in which the ratio between the light grid line width and the dark grid line width is about 1:1.

4. The invention of claim 1 wherein the measuring device operates in the direct light mode; wherein the ratio between the light line width and the dark line width of the one of the measurement and scanning grids is about 3:1, and wherein the other of the measurement and scanning grids comprises a reflection grid which comprises alternating light reflecting and light absorbing lines of a selected width, wherein the ratio between the light reflecting line width and the light absorbing line width is about 1:1.

5. The invention of claim 1 wherein the other of the measurement and scanning grids comprises alternating light and dark lines of selected widths, and wherein the ratio between the light grid line width and the dark grid line width of the measurement grid differs from that of the scanning grid.

6. The invention of claim 5 wherein the ratio between the light grid line width and the dark grid line width of the other of the measurement and scanning grids is about 1:1.

7. In an incremental length or angle measuring device of the type having illumination means, a measurement scale grid, a scanning grid, and photoelectric detector means for detecting the light passing from the illumination means after interacting with both the scanning grid and the measurement grid to the photoelectric means, the two grids being slidable relative to each other and the spacing between them being at a distance $a=kg^2/\lambda$, the improvement comprising:

the measurement grid comprises a grid of alternating dark fields and light fields, the width of each dark field being designated $G_S$ and the width of each light field being designated $G_L$, the ratio of $G_S:G_L$ being 1:1;

the scanning grid comprises a grid of alternating dark fields and light fields wherein the ratio of scanning grid light field width to dark field width lies in the range of about 2:1 to about 7:1;

the factors in the spacing equation $a=kg^2/\lambda$ are defined as follows: k is a constant in the range between about 0.05 and about 0.1, g is the distance equal to the sum of $G_L$ and $G_S$ in the measurement grid, and $\lambda$ is the wavelength of the illuminating light; and the scanning grid defines a grid constant equal to g.

8. The invention defined in claim 7, wherein the factor k has a value of about 0.1.

9. The invention defined in claim 7, wherein the ratio of light field width to dark field width of the scanning grid is about 3:1.

10. The invention defined in claim 7, wherein the ratio of light field width to dark field width of the scanning grid is about 7:1.

11. In an incremental length or angle measuring device of the type having an illumination means, a measurement grid, a scanning grid and a photoelectric detector means for detecting the light passing from the illumination means after interacting with both the scanning grid to the measurement grid to the photoelectric means, the two grids being slidable relative to each other and the spacing between them being defined by $a = kg^2/\lambda$, where k is a constant, g is the grid constant of the measurement grid, and $\lambda$ is the wavelength of the illuminating light, the improvement comprising:

the measurement grid is a grid of alternating light fields and dark fields, the width of each dark field being designed $G_S$ and the width of each light field being designed $G_L$, the ratio of $G_S$ to $G_L$ being 1:1;

the scanning grid comprises an array of alternating scanning grid light fields and scanning grid dark fields, the width of each of the scanning grid dark fields being equal, the width of each of the scanning grid light fields being equal, and the width of each of the scanning grid light fields being at least double that of each of the scanning grid dark fields;

the scanning grid defines a grid constant equal to g; and k is a constant, the value of which is between 0.0 and 0.3.

12. The invention defined in claim 11, wherein the ratio of light field width to dark field width of the scanning grid lies in the range 2:1 to 7:1.

13. The invention defined in claim 11, wherein the constant k lies in the range 0.05 to 0.1.

* * * * *